(12) United States Patent
Arias Polanco et al.

(10) Patent No.: US 12,183,911 B2
(45) Date of Patent: Dec. 31, 2024

(54) POSITIVE PARTICLE ELECTRODE FOR A SECONDARY BATTERY AND METHOD FOR PRODUCING SAME FROM A NANOFIBRE MEMBRANE STRUCTURE

(71) Applicant: INSTITUTO TECNOLOGICO DE SANTO DOMINGO, Santo Domingo (DO)

(72) Inventors: Melvin Santiago Arias Polanco, Santo Domingo (DO); Lorenzo Caputi, Cosenza (IT); Noel Alfonso Upia De La Rosa, Santo Domingo (DO); Alina Mari De Los Santos Torres, Santo Domingo (DO)

(73) Assignee: INSTITUTO TECNOLOGICO DE SANTO DOMINGO, Santo Domingo (DO)

( * ) Notice: Subject to any disclaimer, the term of this patent is extended or adjusted under 35 U.S.C. 154(b) by 264 days.

(21) Appl. No.: 17/616,967

(22) PCT Filed: Dec. 12, 2019

(86) PCT No.: PCT/DO2019/050010
§ 371 (c)(1),
(2) Date: Dec. 6, 2021

(87) PCT Pub. No.: WO2021/058074
PCT Pub. Date: Apr. 1, 2021

(65) Prior Publication Data
US 2022/0336785 A1   Oct. 20, 2022

(30) Foreign Application Priority Data
Sep. 26, 2019 (DM) .................. P2019-0245

(51) Int. Cl.
*H01M 4/04* (2006.01)
*H01M 4/02* (2006.01)

(52) U.S. Cl.
CPC ......... *H01M 4/043* (2013.01); *H01M 4/0411* (2013.01); *H01M 2004/028* (2013.01)

(58) Field of Classification Search
CPC ............... H01M 4/043; H01M 4/0411; H01M 2004/028
See application file for complete search history.

(56) References Cited

U.S. PATENT DOCUMENTS

| | | |
|---|---|---|
| 2007/0087268 A1 | 4/2007 | Kim |
| 2008/0274403 A1 | 11/2008 | Kim et al. |
| 2018/0337391 A1 | 11/2018 | Yu |

FOREIGN PATENT DOCUMENTS

| | | |
|---|---|---|
| EP | 1873846 | 1/2008 |
| EP | 2075864 | 7/2009 |

(Continued)

*Primary Examiner* — Mathieu D Vargot
(74) *Attorney, Agent, or Firm* — Defillo & Associates, Inc; Evelyn A. Defillo

(57) ABSTRACT

A positive electrode of an active material of interconnected polycrystalline and porous particles for secondary battery has been developed to achieve greater diffusion, excellent specific capacity and life cycle. The active material of the positive electrode for secondary battery is obtained from a hot-pressing process to which the composite fiber membrane is subjected with the precursors of the active metals and the polymer, obtaining morphologies such as monocrystalline particles, two-dimensional plates, and bars.

8 Claims, 6 Drawing Sheets

(56) References Cited

FOREIGN PATENT DOCUMENTS

| | | |
|---|---|---|
| EP | 3145001 | 3/2017 |
| KR | 101147923 | 7/2012 |
| WO | WO2010002084 | 1/2010 |
| WO | WO2010138619 | 12/2010 |
| WO | WO201129058 | 3/2011 |
| WO | WO2013130690 | 9/2013 |
| WO | WO2013169223 | 11/2013 |
| WO | WO2015144648 | 10/2015 |

3-D Morphology

Figure 1 Continuation: Porous Plate Type 2D Structures.
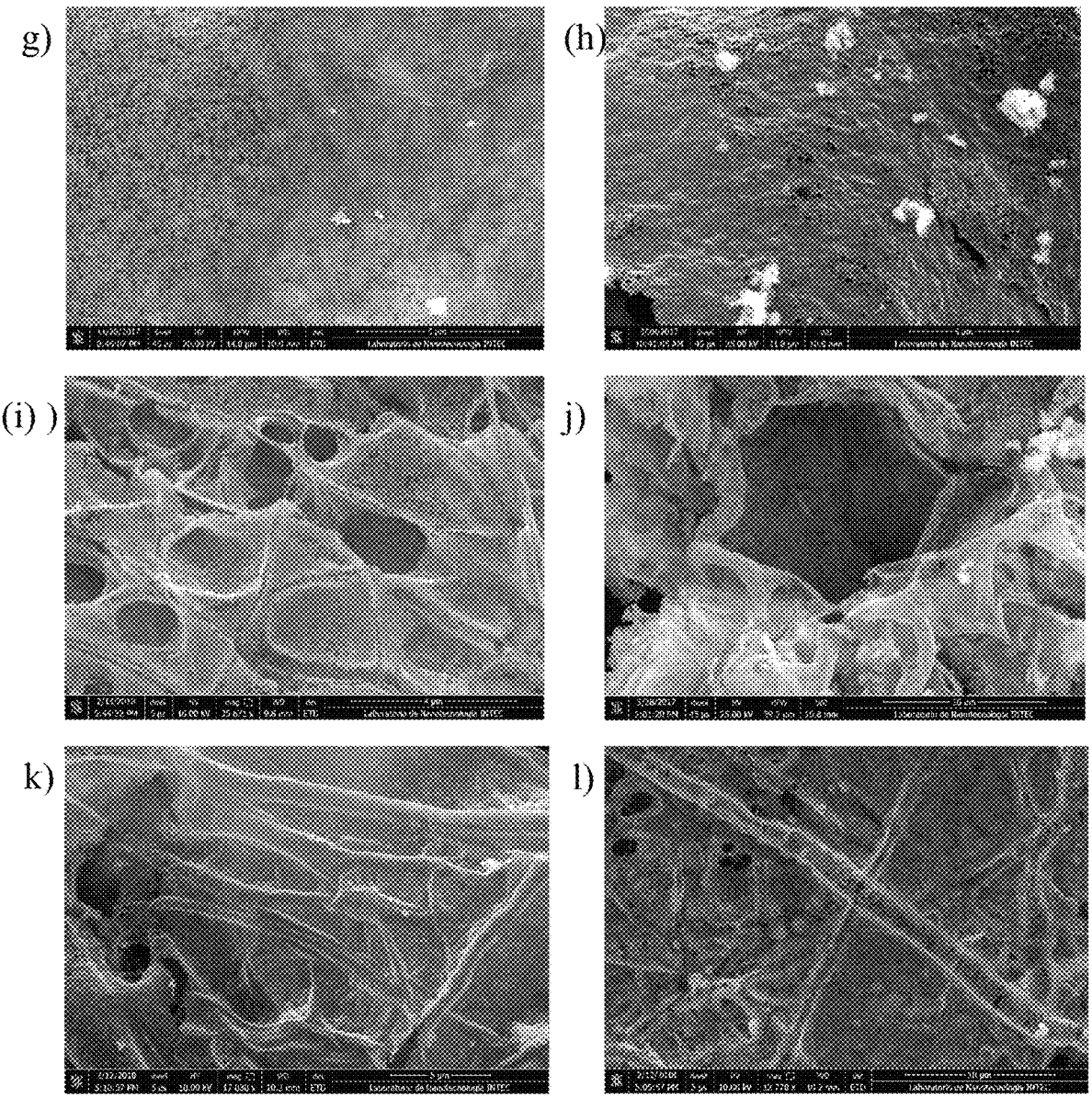

Figure 1 Continuation: Porous Plate Type 2D Structures.
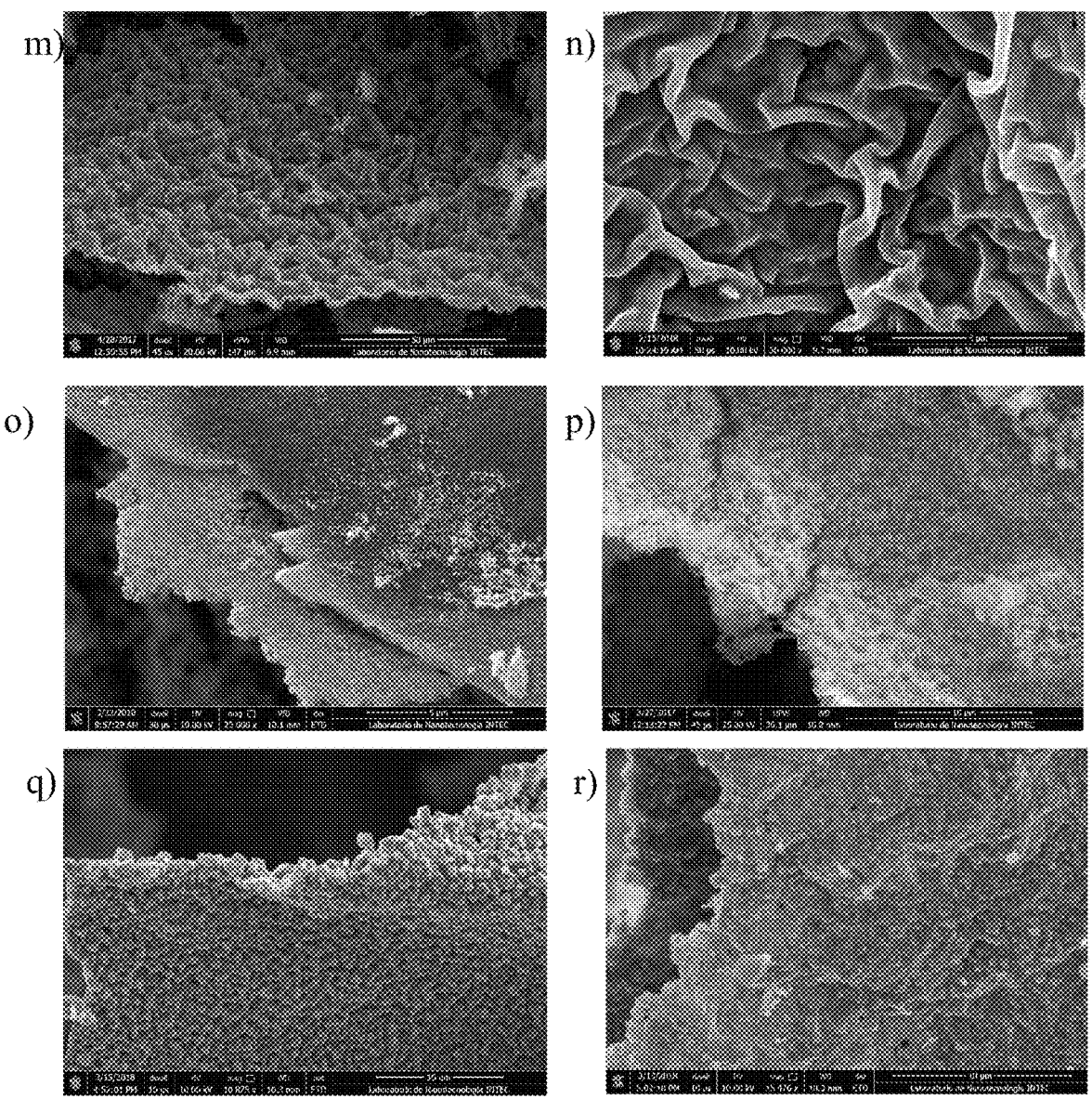

Figure 1 Continuation: Porous Plate Type 2D Structures.
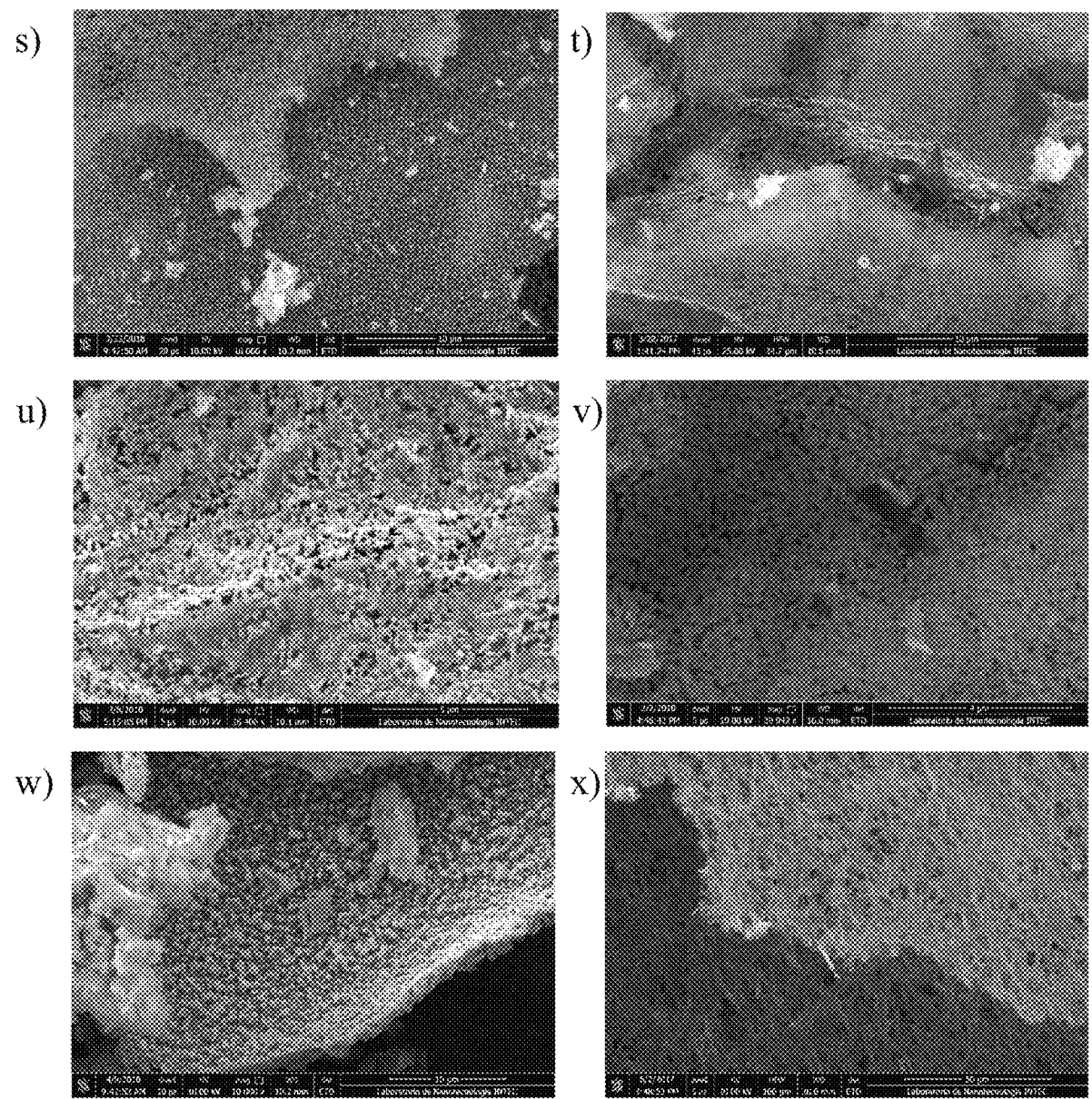

Figure 1 Continuation: 1D structures nanobars and nanoneedles
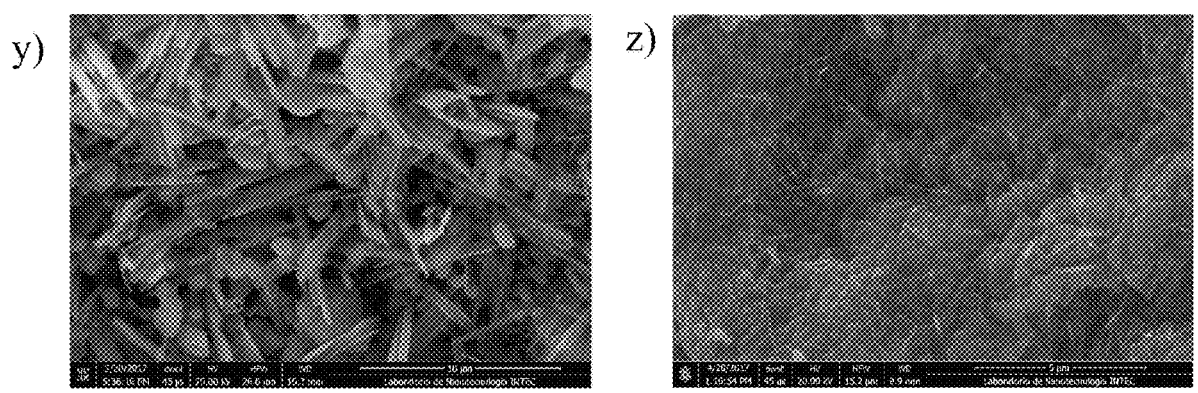
Figure 2
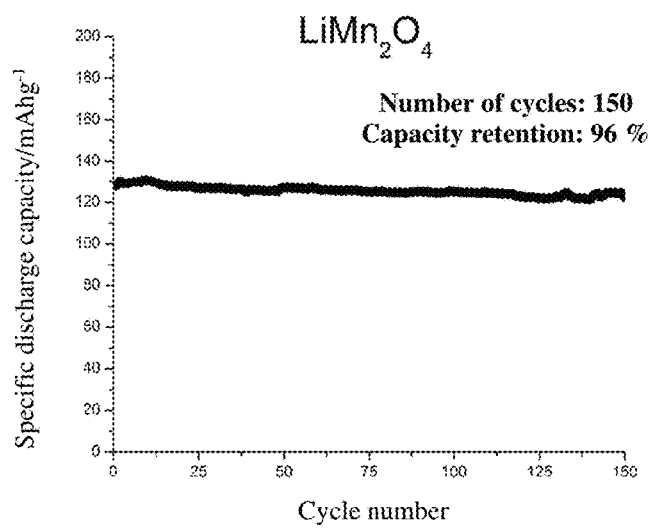

Figure 3. X-ray diffraction
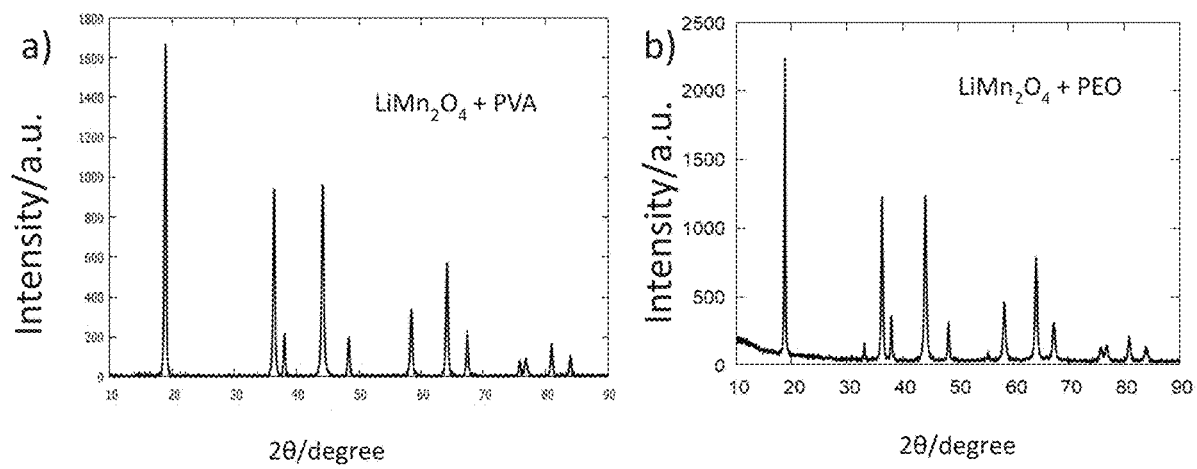

POSITIVE PARTICLE ELECTRODE FOR A SECONDARY BATTERY AND METHOD FOR PRODUCING SAME FROM A NANOFIBRE MEMBRANE STRUCTURE

CROSS REFERENCE TO RELATED APPLICATION

This application is a national stage entry of PCT/DO2019/050010 filed Dec. 12, 2019, under the International Convention and claiming priority over Dominican Republic Patent Application No. P2019-0245 filed Sep. 26, 2019.

FIELD OF INVENTION

The present invention refers to a positive electrode for rechargeable battery of ions of: lithium, sodium or magnesium; and a method for producing such a positive electrode.

DESCRIPTION OF PRIOR ART

The rechargeable batteries cells composed of active materials such as the positive electrode (cathode), the negative electrode (anode), the electrolyte; and a membrane as a separator between the two electrodes. Active materials for rechargeable batteries attract attention in terms of research, innovation and development, especially the positive electrode of lithium-ion batteries, sodium and magnesium.

Positive electrodes containing an alkaline or alkaline metal in combination with rechargeable battery transition metal oxides are used as active material for alkaline or alkaline-earth metal ion batteries such as battery Lithium-ion, sodium ion battery and magnesium ion batteries. The compounds and their derivatives that commonly represent positive electrodes of active materials to be used in rechargeable batteries are, for lithium ion: $LiCoO_2$, $LiNiO_2$, $LiMn_2O_4$, $LiMn_{1.75}Ni_{0.25}O_4$, $LiFePO_4$, $LiV_2O_5$, $Li_4Ti_5O_{12}$, $LiNi_{0.8}Co_{0.15}Al_{0.05}O_2$, $LiNi_{1/3}Mn_{1/3}Co_{1/3}O_2$, $LiNi_{1/5}Mn_{1/3}Co_{1/2}O_2$, $LiNi_{1/4}Mn_{1/4}Co_{1/2}O_2$.

For sodium ion: $Na_{1-x}MO_2$ (with M: transition metal and x<1), $NaFePO_4$, $Na_2FeP_2O_7$, $Na_3V_2(PO_4)_3$, $NaMSO_4F$ (where M: Fe, Co, and Mn), $Na_xMFe[CN]_6$ (where M: Fe, Mn).

For magnesium ion: $MgMn_2O_4$, $MgxLiV_2(PO_4)_3$, $MgxTi_2S_4$, $MgA_2B_4$ (where B=S or Se, while A=In, Y, or Sc).

These materials and their derivatives, used as positive electrodes for either of lithium-ion, sodium-ion or magnesium-ion rechargeable batteries, have shown good electrochemical properties such as its storage capacity, performance rate, internal strength, structural stability, ion diffusion and safety. These positive electrodes for rechargeable batteries cover energy demand from small, medium and large-scale equipment such as: toys, medical devices, lighting, mobile devices, phones, computers, cars, electrical energy storage system for residential and commercial usage.

Although each active material as a positive electrode for rechargeable batteries shows excellent electrochemical properties, they have problems in one or more of some particular properties: life cycle, heat stability, diffusion of ions, energy and power. Those of positive electrodes of lithium ion, are the most demanded in the market for showing better electrochemical properties are highly recommended for example for CMOS circuits because their output voltage is quite stable, they have also demonstrated a low internal pressure and their self-discharge is practically non-existent: less than 1%. However, also combined, for example, of lithium-nickel-manganese-cobalt oxide compound followed by lithium-nickel-cobalt-aluminum and lithium-iron phosphate, according to market demands have thermal stability problems, low energy and moderate life cycle.

According to Muñoz Márquez from CIC energiGUNE Interfaces group, a modification of its design and the materials used in its construction is necessary in order to keep up with new demands and overcome the safety, aging and cost issues affecting today's Li-ion battery technology, such as the energy storage ability, and where the thin layer processing alternative could achieve partial solution of some drawbacks such as security, a major improvement in current applications and will involve implementation of thin-layer Li-ion batteries in new fields of application such as satellites and sensors for autonomous navigation. Other aspects that in the case of Li-ion batteries demand innovation according to the experts is the reduction of production costs which is another issue that the market today demand for this type of battery, although Li-ion batteries are known to have reduced their cost in the last 10 years, from almost 1000 euros/kWh in 2007 to less than 250 euros/kWh in 2017, is necessary to ensure better satisfactions of the potential market demands, to go down to at least 100 euros/kWh, for example to achieve greater electrification in the transport sector. The aging of this type of battery is also an aspect that requires innovation, because this parameter includes both the time from assembly to commercialization or commissioning, and the number of charge and discharge cycles that the battery performs and under what conditions it performs them.

The manufacture and control of crystalline morphologies in different dimensions, as well as coating and doping have shown significant progress in overcoming persistent problems in the active materials of batteries Rechargeable. In this direction, the electrospinning method and its derivatives to produce functional micro and nano fiber, shows a high feasibility, especially for its high porosity, pore connectivity, a larger surface area in relation to volume and flexibility. Nanofibers produced as positive electrodes for rechargeable batteries have shown better electrochemical properties than nanoparticles. Polymers carbon residues have been used to improve conduction and diffusion properties. The solution proposal for patent KR101147923 proposes carbon nanofibers to achieve a high and uniform specific surface area that, in the properties of paper, felt, nonwoven fabric can produce high performance of the active electrode to ensure better material results, creating an advantage. Carbon nanofibers that have nano graphite structures have relatively large specific surface area, and the smaller the pore depth, the size of the micropores from 1 to 2 nm will maintain a faster desorption speed, a uniform structure and a low-energy narrow pore size distribution. The proposal for this change in energy storage improves selective adsorption properties, this solution proposal aims to have larger amounts of energy storage material with high efficiency and low pollution to ensure a small type of mobile power supply system where a light weight is currently essential. In this case, to achieve 2D nanostructure formation for active materials such as positive electrodes, graphite plates were used as template (Journal of Power Sources 328 (2016) 345-354).

To obtain active material as a negative electrode for rechargeable lithium battery from fiber membrane and hot pressing, it has been proposed an alternative solution in the patent application WO2010002084A1 consisting of the anode for a secondary battery that uses a metal oxide nanofiber in the form of a band where a fiber band is a precursor of metallic salt polymer formed by yarn of a solution in which no less than two types of metal salt precursors and a polymer are mixed with each other, thermally compressed and pressured to form a system of nanoparticle components of at least two types of ternary or higher metal oxides.

In this case the two types of metal oxides are selected from a group consisting of $SnO_2$, $TiO_2$, $Fe_2O_3$, $Fe_3O_4$, CoO, $Co_3O_4$, CaO, MgO, CuO, ZnO, $In_2Or_3$, NiO, $MoO_3$, $MnO_2$, or $WO_3$. On this basis they design a secondary battery, comprising an anode with a negative active material compressed on at least one surface of the anode collector; an electrolyte; and a cathode, in which the negative active material is a thin layer of a band-shaped metal oxide nanofiber of a composite fiber precursor of metal salt polymer formed by yarn of a solution in which no less than two types of precursors d and metal salt and a polymer that are mixed thermally and pressed. The polymer intended for use is one of: polyurethane, polyethylene rudethane, copolymer of PDL urethane, cellulose acetate, cellulose acetate butyrate, cellulose acetate propionate, methyl polymethacrylate, polymethacrylate, polyacrylic copolymer, polyvinyl acetate, polyvinylacette copolymer, polyvinylacline alcohol, alcohol, alcohol polyfurfuryl, polystyrene, a polystyrene copolymer, polyethylene oxide, polypropylene oxide, a polypropylene oxide copolymer, polycarbonate, polyvinyl-salt, polycaprolactone, polyvinylpyrrolidone, vinyl polyfluoride, a polyvinylidene fluoride copolymer, polyamide, polyacrylonitrile, pitch, or phenol resin.

WO2010138619 proposes a solution based on a layer structure of electrodes for use in rechargeable lithium-ion batteries, these electrode layers have interconnected hollow nanostructures containing high material capacity electrochemically active, such as silicon, tin and germanium. The proposed technique in this case is to form a nanoscale coating, around multiple template structures and at least partially removing and/or shrinking these structures to form gaps or cavities. These cavities provide space for the active material of the nanostructures to swell during battery processing, the design helps reduce the risk of spraying and to maintain electrical contacts between the nanostructures providing a larger surface area.

EP2075864 proposes a solution to the problem based on a cathode lithium cell material, comprising a lithium oxide porous microparticle, together with a second conductive layer covering at least one surface of one of the nanoparticles of lithium oxide, in contact with the first conductive layer with a conductive fiber that connects to the second conductive layer to form a three-dimensional conductive network between the lithium oxide nanoparticles that have an average diameter of 1-50 micrometers with a porosity of 0.02-0.12 c.c./g. forming a spinel layer structure, or olivine.

EP1873846 is based on a solution proposal to the problem posed in the development of a negative electrode for secondary lithium batteries that are based on the application of particles of active material that is electrochemically adsorbed and discharges of lithium; in this case they comprise a first metal that has mainly a lithium adsorption and discharge property; and a second metal that has a property of stabilizing the shape shift of the first metal after lithium adsorption and discharge, where an alloy composition composed of the first metal and the second metal forms a main component of it, in this case the second metal is selected from the group consisting of iron, cobalt, copper, nickel, chrome, magnesium, lead, zinc, silver, germanium, manganese, titanium, vanadium, bismuth, indium and antimony. The active material particles of the negative electrode for secondary lithium batteries as proposed in this case contains one type or two or more types of metals selected from the group consisting of silicon, tin and aluminum and contains one type or two or more types of metals selected from the group consisting of iron, aluminum, chromium, magnesium, manganese, antimony, lead, zinc and silicon. In this case the negative electrode active material for secondary lithium batteries, which is electrochemically adsorbed.

EP3145001 proposes an active electrode material comprising a secondary particle, the secondary particle comprising a plurality of primary particles of a material containing silicon; an electrically conductive material. A water-insoluble chemically crosslinked polymer that is effective in acting as a reaction barrier to lithium ions and diffusion to lithium ions, relative to the plurality of primary particles of the silicon-containing material; in this alternative the chemically crosslinked uncarbonized polymer is insoluble in water, and comprises at least polyvinyl alcohol, poly (acrylic acid), a poly (acrylic acid) replaced with an alkaline cation or ammonium ion, polyimide, polyamidaimide, polyvinylidene fluoride, carboxymethylcellulose, carboxymethylcellulose sodium salt, carboxymethyl cellulose ammonium salt, methylcellulose, hydroxymethylcellulose, hydroxypropylelusae, ethylcellulose, diacetyl celulose, polytetrafluoroethylene, polyethylene and polypropylene.

In this case the electrically conductive material comprises at least one carbonous material, a metal nanostructure and an electrically conductive polymer. The carbon material can be smoke black, natural graphite, artificial graphite, black acetylene, black Ketjen, carbon nanofiber, carbon nanotubes, graphene and expanded graphite; in this case the proposed metal nanostructure comprises at least one selected nanoparticle of gold, copper, nickel, aluminum, silver, titanium nitride, gold nanofibers, nickel copper, aluminum or silver; TiN nanofibers or nanotubes, gold nanotubes, copper, nickel, aluminum, or silver. In this proposal the electrically conductive polymer comprises at least one selected polyfluorene, polyphenylene, polypyrene, Polypyrrol, polyazulene, polynaftalene, polycarbazole, polyindol, polyacepline, polythiophiline, poly (3,4-ethylendioxythiophene), poly (p-phenylene sulfide), polyacetylene, poly (p-phenylene vinylene), -polystyrene sulfonate, a derivative of himself, and a copolymer of it. The particle size is in a range of 1 nanometer to 1 micrometer. It is highlighted in this solution that the coating layer comprises an inorganic nanoparticle and is arranged on a surface of the silicon core, preferably where the inorganic nanoparticle comprises at least one selected from $Al_2O_3$, $TiO_2$, $Li_4Ti_5O_{12}$, $La_2Zr_2O_7$, and $Li_7La_3Zr_2O_{12}$.

WO2015144648 suggests a process for making an electrode comprising a composite material comprising the following steps: placing a sheet or plate made of a porous cellulose material comprising a first face and a second face separated by a thickness on a support plate, being the second side in contact with the support plate; add a suspension, paste, suspension or ink comprising a composite material, a polysaccharide or electron conductor and a solvent; the base material is composed of composite comprising nano objects made from at least one first electron conductor and a second material different from the first material; deposit the suspension, paste, suspension or ink, coated or printed on the first side of the sheet; so that the viscosity of the suspension, paste, suspension or ink is such that the sheet absorbs the ink only in a portion of its thickness; finally without waiting for drying a current collector is added to the first side, coated with ink, of the sheet, so the current collector is at least partially encrusted in the ink deposit; it then comes into contact with an aqueous solution of polysaccharide crosslinking containing at least one water-soluble salt, capable of releasing monovalent, divalent or trivalent cations; so the ink is reticulated, gelled. The sheet and support plate undergo a freeze-drying treatment for later to separate the sheet of the support plate.

WO201129058 suggests an electrode comprising a plurality of layers, each layer comprising particles of active material capable of reversibly store ions; and, conductive particles, where such plurality of layers has at least one layer that is functionally different from at least one other layer, in which the electrode comprises at least one functional gradient. Conductive particles comprise a selected conductive material of the group consisting of buckyballs; buckminsterfullerenes; coal; carbon black; black ketjan; carbon nanostructures; carbon nanotubes; carbon nanoballs; Carbon fiber; graphite; graphene graphite leaves and graphite nanoparticles; The electrode in this case comprises a current collector that has first and second sides; and b) a second electrode comprising particles of active material capable of reversiblely storing ions; and conductive particles, in which the first electrode is attached to that first side of that current collector, and that second electrode is attached to a second side of that current collector. The second electrode comprises a plurality of layers, each layer comprising particles of active material capable of storing reversible ions; and, conductive particles, where such plurality of layers has at least one layer that is functionally different from at least one other layer, where said the first electrode is attached to the first side of said current collector, and that second electrode is attached to said second side.

However, and despite of all solution proposals, the market requires the production and control of morphologies in 1-D, 2-D and 3-D of active material for positive rechargeable battery electrode that can improves the electrochemical properties: life cycle, ion diffusion and energy.

DESCRIPTION OF THE INVENTION

The present invention provides a method for the synthesis of positive electrode of active material with morphology in 1-D, 2-D or 3-D for secondary battery and the method of its production. The method is to take nano or micro fiber mat with precursor compounds as a positive electrode for secondary lithium battery, placing the fiber membrane between two plates ranging from mesopores to micropores, where a pressure is exerted between the plates from 1 to 10 kPa while the baking process is carried out in the range of 250 to 1000° C. in an oxidizing atmosphere or in an inert atmosphere or combination between them and in a time between 0.5 h to 75 h.

BRIEF DESCRIPTION OF THE DRAWINGS

FIG. 2—Specific discharge capacity performed at room temperature of the compound $LiMn_2O_4$ obtained from hot pressing at 700° C. of the fiber membrane with lithium, manganese and PVA polymer precursor metals;

FIG. 3a shows the x-ray diffraction that shows that the material obtained is $LiMn_2O_4$ with the 227 spatial group corresponding to the spinel; and FIG. 3b shows the x-ray diffraction showing that the material obtained is $LiMn_2OR_4$ and also co-exists $Mn_2Or_3$.

DETAILED DESCRIPTION OF THE INVENTION

Figure 1:
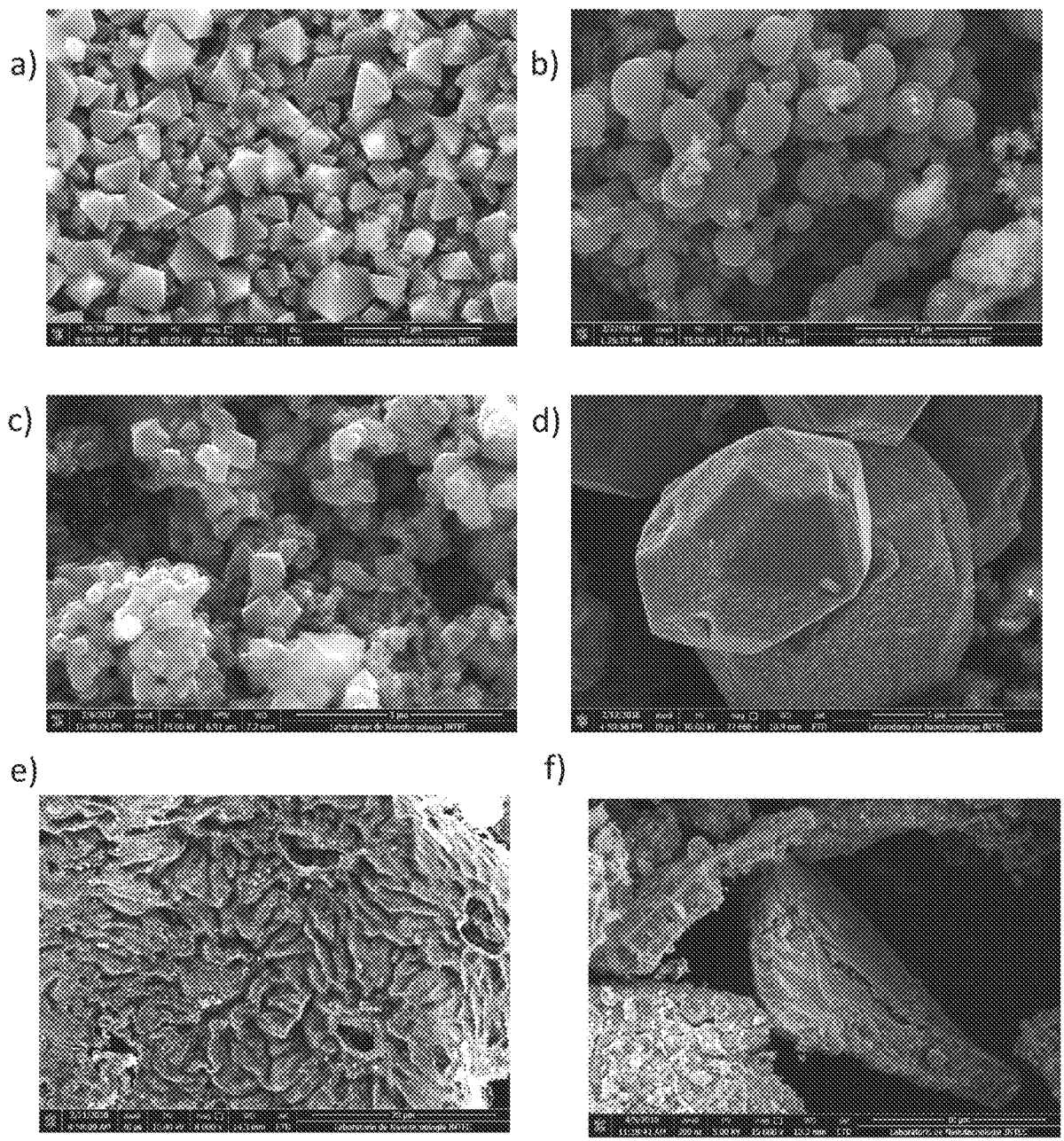
FIGS. 1a-1d show images of the electronic scanning microscope showing 3-D monocrystalline particles from different morphologies of $LiMn_2O_4$ obtained from fiber membranes with metals precursors (Li and Mn), and polymers (PEO, PVAc, PVA, PAN), and hot pressing at 700° C.
FIGS. 1e-1f show images of the electronic scanning microscope showing 3-D blocks
FIGS. 1g-1w show images of the electronic scanning microscope showing a 2-D porous plates.
FIGS. 1x-1y show images of the electronic scanning microscope showing a 1-D bars.
FIG. 1z shows an image of the electronic scanning microscope showing a 1-D structure nanoneedles.

The present invention aims to offer more effective solution alternatives proposing new morphologies in 1-D, 2-D and 3-D of active material for positive electrode of battery ensuring better electrochemical properties such as those materialized according to life cycle, ion diffusion and energy, compared to proposals solution for the same purpose of manufacturing positive electrode for rechargeable battery of: lithium, sodium or magnesium that do not yet fully meet the requirements of current demand of the market for these types of rechargeable batteries. Most of the above technical solutions are based on a method for the manufacture of polycrystallines, porous two-dimensional plates, open fiber channels and morphology type "brain surface" of active material to be used as a positive electrode in rechargeable lithium-ion, sodium ion or magnesium ion battery; obtained from using fiber membrane with precursor metals and polymers, which were then subjected to a hot-pressing process.

For the synthesis of the fibers that we propose in this invention can use the electrospinning method and its derivatives or any equivalent process that allow general a mat or membranes of fibers, in which the average diameter of the fibers can be 10 to 2000 nm, preferably with diameter from 50 to 1000 nm. Fibers can include two or more metals and one or more non-precursor metals:

1. Alkaline metals (preferably, but not limited to: Li, Na, K, Rb)
2. Alkaline earth metals (preferably, but not limited to: Be, Mg, Ca, Sr),
3. Transition metals (preferably, but not limited to: Ti, V, Cr, Mn, Fe Co, Ni, Cu, Zn, Mo, Pd, Ag, Au)
4. Block metals p (preferably, but not limited to: Al, In, TI, Sn, Ge).
5. Non-metals (preferably, but not limited to: P, C, O, S)
6. Metals from groups 13 and 14.

In the process of the synthesis of these fibers, the precursor compounds without limitation, can be: acetates, carbonates, nitrates, metal oxides, hydroxides and liquid solutions; preferably proposed can be acetates, carbonates and nitrates. As for the polymer can be selected from a wide group of variants, such as polyvinyl alcohol (PVA), polyvinyl acetate (PVAc), Polyethylene oxide (PEO), polyurethane, urethane polyether, polyurethane copolymer, cellulose acetate, cellulose butyrate acetate, cellulose acetate propionate, bromomethacrylate acrylate (PMMA), acrylate polymethyl (PMA), polyacrylic copolymer, copolymerorpolyvinyl acetate bit,fury poly-flops alcohol (PPFA), polystyrene, polystyrenecopolymer, poly (polypropylene oxide) (PPO), polyethylene oxide copolymer, polypropylene oxide copolymer, polycarbonate (PC), polyvinyl chloride (PVC), polycaprolactone, polyvinylpyrrolidone (PVP), polyvinyl fluoride poly vinylidene fluoride copolymer, polyamide, polyacrylonitrile (PAN), tar, among other polymers. Preferably to use: PVA, PEO, PVAc, PMA and PAN. Water, dimethylformamide, acetone, methanol, ether or toluene can be used as a solvent.

The method to produce fibers and environmental conditions can vary from an electric field, centrifugal force, melting or blowing. To produce polycrystals, in the form of porous two-dimensional plates and other 2D and 3D morphologies, the fiber membrane is used, composed of the precursors of the activated material or for positive electrode of rechargeable bating and polymer or polymers, which undergoes a hot pressing process, where temperature conditions can go preferably between 250 and 1000° C., and at a pressure preferably between 1 and 10 bar, in an oxidizing or inert atmosphere or combination between them and in a time range of 0.5 to 75 h.

Example 1

The metal precursors used are lithium dihydrate acetate, manganese acetate (II) tetrahydrate, which were used to obtain $LiMn_2O_4$.

A solution was prepared by mixing in the range of 2 to 20% (% by weight) of PVA, 72 to 90% (% by weight) of distilled water, and 8% (% by weight) of the precursors Li, Mn in stochiometric proportion of Li:Mn of 1:2. The reagents were mixed from 3 to 4 hours at 80° C. until completely dissolved. The solution obtained was used to produce fibers by centrifuge extraction using electric field. The fibers obtained were calcined for 24 hours at a temperature between 450° C. and 800° C., in air, pressed between two plates of 4-inch diameter non-porous alumina and 250 g mass.

Electrochemical tests were performed in CR2032 coin-type battery, manufactured in a glove box in argon atmosphere. The cathode was formed from a mixture by weight of 80% $LiMn_2O_4$ material, 10% Super P carbon and 10% polyvinyl fluoride on a 16 mm diameter disc of aluminum foil. Celgard 2400 was used as separator, as electrolyte 1M $LiPF_6$ in ethylene carbonate and ethyl methyl carbonate (50:50 vol %) and metallic lithium as a counting electrode.

FIGS. 1$i$, 1$k$, 1$l$, 1$u$, 1$v$, 1$x$, 1$y$ show images taken with the electronic scanning microscope (SEM), it can be seen porous plaque morphology made up of 200 nm bonded grains. In FIG. 2 you can see the specific discharge capacity for the manufactured battery, it shows a high capacity of 130 mAh/g and a capacity retention of 96% after 150 cycles. FIG. 3($a$) shows the x-ray diffraction that shows that the material obtained is $LiMn_2O_4$ with the 227 spatial group corresponding to the spinel.

Example 2

A solution similar to Example 1 is prepared, and fibers are produced in a similar way. The obtained fibers were subjected to calcination for 24 hours pressed between two porous alumina plates of 2 inches in diameter and mass 250 g, with pores of 4 m to 6 m.

Electrochemical tests were performed with the same procedure as in example 1.

FIGS. 1$q$, 1$r$, show photographs taken with the SEM, where it can be seen porous plate-type morphology formed by 1 μm grains attached.

Example 3

A solution similar to Example 1 is prepared. The fibers obtained were calcinated for 24 hours pressed between two porous alumina plates 2 inches in diameter and mass 250 g, with pores of 1 m to 3 m at atmospheric pressure in air.

Electrochemical tests are performed with the same procedure as in example 1.

FIGS. 1$a$, 1$f$, 1$e$, 1$n$, 1$w$ show images taken with the SEM where both porous plate structures and 500 nm particles are verified.

Example 4

The metal precursors used are lithium dihydrate acetate, manganese acetate (II) tetrahydrate, which were used to obtain $LiMn_2O_4$.

A solution was prepared by mixing in the range of 2 to 20% (% by weight) of PEO, 72 to 90% (% by weight) of distilled water, and 8% (% by weight) of the precursors Li, Mn in stochiometric proportion of Li:Mn of 1:2. The reagents were mixed from 3 to 4 hours at 80° C. until completely dissolved. The solution obtained was used to produce fibers by centrifuge extraction using electric field. The fibers obtained were calcined for 24 hours at a temperature between 450° C. and 800° C., in pressed air between two plates of 4-inch diameter non-porous alumina and 250 g mass.

Electrochemical tests are performed with the same procedure as in example 1.

FIGS. 1$b$, 1$g$, 1$h$, 1$j$, 1$o$, 1$s$, 1$t$ show images taken with the SEM showing porousplate-type morphology as well as particles. FIG. 3($b$) shows the x-ray diffraction showing that the material obtained is $LiMn_2OR_4$ and also co-exists $Mn_2Or_3$.

Example 5

The metal precursors are sodium acetate trihydrate, manganese acetate tetrahydrate to obtain $NaMn_2or_4$.

It is prepared a solution by mixing in the range of 2 to 20% (% by weight) of PVA, 72 to 90% (% by weight) of distilled water, and 8% (% by weight) of the precursors Na, Mn in stochiometric proportion of Na:Mn 1:2. The reagents were mixed from 3 to 4 hours at 80° C. until completely dissolved. The obtained solution is used to produce fibers by centrifuge extraction applying electric field. The fibers obtained are calcined for 24 hours pressed between two porous alumina plates 2 inches in diameter and mass 250 g, with pores from 1 mm to 3 m, at a temperature understood between 450° C. and 800° C., with pores from 1 mm to 3 m at atmospheric pressure in air.

Electrochemical tests are performed on CR2032 coin-type battery, manufactured in a glove box in argon atmosphere. The cathode is formed from a mixture by weight of 80% $NaMn_2Or_4$ material, 10% Super P carbon and 10% polyvinyl fluoride on a 16 mm diameter disc of paper Aluminum. Celgard 2400 is used as a separator, as electrolyte 1 M $NaPF_6$ in ethylene carbonate and ethyl methyl carbonate (50:50 vol %) and metallic sodium as a counting electrode.

Example 6

The metal precursors are magnesium acetate tetrahydrate, manganese acetate tetrahydrate to obtain $MgMn_2O_4$.

It is prepared a solution by mixing in the range of 2 to 20% (% by weight) of PVA, 72 to 90% (% by weight) of distilled water, and 8% (% by weight) of the precursors Na, Mn in stochiometric proportion of Mg:Mn 1:2. The reagents were mixed from 3 to 4 hours at 80° C. until completely dissolved. The obtained solution is used to produce fibers by centrifuge extraction applying electric field. The fibers obtained are calcined for 24 hours pressed between two porous alumina plates of 2 inches in diameter and mass 250 g, with pores of 1 m to 3 m, at a temperature between 450° C. and 800° C., with pores from 1 mm to 3 m at atmospheric pressure in the air.

Electrochemical tests are performed on CR2032 coin-type battery, manufactured in a glove box in argon atmosphere. The cathode is formed from a mixture by weight of 80% $MgMn_2Or_{4\ material}$, 10% Super P carbon and 10% polyvinyl fluoride on a 16 mm diameter disc of paper Aluminum. Celgard 2400 is used as a separator, sand used propylene carbonate containing 0.2M magnesium acetate and 0.1 M aluminum chloride as electrolyte, magnesium metal as a counting electrode.

The invention claimed is:

1. A method for manufacturing an active material as a positive electrode for a secondary lithium-ion battery, a sodium ion battery, or a magnesium ion battery, the method comprising the steps of:
    mixing a solvent, at least one polymer, and at least one metal precursor, to produce a solution;
    centrifuging the solution using an electric field to produce fibers;
    calcinating the fibers to a temperature between 250 to 1000° C. in an air atmosphere, an oxidizing inert atmosphere, or combination thereof, to produce calcinated fibers;
    pressing between two plates the calcinated fibers to produce a fiber membrane, wherein the calcinating step and the pressing step are done simultaneously;
    producing the positive electrode by using the fiber membrane from the previous step;
    wherein the metal precursor is selected from the group consisting of acetates, carbonates, and nitrates and includes at least two metals selected from the group consisting of alkaline metals, alkaline earth metals; transition metals; and metals from groups 13 and 14; and
    wherein the fibers of the fiber membrane have an average diameter between 10 to 2000 nm.

2. The method of claim 1, wherein the mixing step further includes adding at least one non-metal element selected from the group consisting of phosphorus, carbon, fluoride, and sulfur.

3. The method of claim 1, wherein the at least one polymers is selected from the group consisting of polyvinyl alcohol (PVA), polyvinyl acetate (PVAc), polyethylene oxide (PEO), polyurethane, urethane polyether, polyurethane copolymer, cellulose acetate, cellulose butyrate acetate, cellulose acetate propionate, bromomethacrylate acrylate (PMMA), polymethyl acrylate (PMA), polyacrylic copolymer, polyvinyl acetate copolymer, polymerized furfuryl alcohol (PPFA), polystyrene, polystyrene copolymer, poly(polypropylene oxide) (PPO), polyethylene oxide copolymer, polypropylene oxide copolymer, polycarbonate (PC), polyvinyl chloride (PVC), polycaprolactone, polyvinylpyrrolidone (PVP), polyvinyl fluoride (PVF), polyvinylidene fluoride (PVDF), polyamide, polyacrylonitrile (PAN), tar, and mixtures thereof.

4. The method of claim 1, wherein the alkaline metals are selected from the group consisting of lithium, sodium, potassium, and rubidium.

5. The method of claim 1, wherein the alkaline earth metals are selected from the group consisting of beryllium, magnesium, calcium, and strontium.

6. The method of claim 1, wherein the transition metals are selected from the group consisting of titanium, vanadium, chromium, manganese, iron, chromium, nickel, copper, zinc, palladium molybdenum, and silver.

7. The method of claim 1, wherein the metals from groups 13 and 14 are selected from the group consisting of aluminum, indium, titanium, tin, and germanium.

8. The method of claim 1, wherein the solvent is selected from the group consisting of water, dimethylformamide, acetone, methanol, ether, and toluene.

* * * * *